(12) United States Patent
Kay

(10) Patent No.: US 7,937,756 B2
(45) Date of Patent: May 3, 2011

(54) APPARATUS AND METHOD FOR FACILITATING NETWORK SECURITY

(75) Inventor: Rony Kay, Cupertino, CA (US)

(73) Assignee: Cpacket Networks, Inc., Mountain View, CA (US)

( * ) Notice: Subject to any disclaimer, the term of this patent is extended or adjusted under 35 U.S.C. 154(b) by 935 days.

(21) Appl. No.: 11/208,022

(22) Filed: Aug. 19, 2005

(65) Prior Publication Data

US 2007/0058540 A1  Mar. 15, 2007

(51) Int. Cl.
*H04L 12/26* (2006.01)
(52) U.S. Cl. ............. 726/22; 726/3; 370/230; 709/224; 713/164; 713/168; 380/247
(58) Field of Classification Search ............... 726/3, 11, 726/22, 23; 370/230, 389; 709/223, 224, 709/250; 725/22; 713/161, 164, 166, 168; 380/247–250
See application file for complete search history.

(56) References Cited

U.S. PATENT DOCUMENTS

| | | | |
|---|---|---|---|
| 5,612,729 A | 3/1997 | Ellis et al. | |
| 5,765,026 A * | 6/1998 | Lin et al. | |
| 6,076,115 A | 6/2000 | Sambamurthy | |
| 6,639,896 B1 * | 10/2003 | Goode et al. | 370/224 |
| 6,807,611 B2 | 10/2004 | Hauck et al. | |
| 6,870,929 B1 * | 3/2005 | Greene | 380/28 |
| 7,032,003 B1 * | 4/2006 | Shi et al. | 709/203 |
| 2002/0012340 A1 * | 1/2002 | Kalkunte et al. | |
| 2004/0054925 A1 * | 3/2004 | Etheridge et al. | 713/201 |
| 2004/0093521 A1 | 5/2004 | Hamadeh et al. | |
| 2004/0165588 A1 | 8/2004 | Pandya | |
| 2005/0102393 A1 * | 5/2005 | Murray et al. | 709/224 |
| 2006/0026669 A1 | 2/2006 | Zakas | |
| 2007/0064717 A1 * | 3/2007 | Tze-Si Wu et al. | 370/412 |

FOREIGN PATENT DOCUMENTS

| | | |
|---|---|---|
| EP | 1 202 500 A2 * | 5/2002 |
| WO | PCT/US07/72536 ISR | 7/2008 |

OTHER PUBLICATIONS

International Search Report and Written Opinion mailed Sep. 20, 2007 for International Application No. PCT/US06/32257, 10 pages.
PCT/US2007/072524 International Search Report (Apr. 8, 2008) C-Packet Networks.
PCT/US2007/072530 International Search Report (Mar. 4, 2008) C-Packet Networks.
Kay, U.S. Appl. No. 11/483,265, filed Jul. 7, 2006. Office Action mailed Aug. 9, 2010.

(Continued)

*Primary Examiner* — Benjamin E Lanier
*Assistant Examiner* — Hadi Armouche
(74) *Attorney, Agent, or Firm* — Cooley LLP

(57) ABSTRACT

An embodiment of an apparatus that facilitates network security and traffic monitoring for input network traffic includes a plurality of microcode controlled state machines, each of which includes a computation kernel. A plurality of rules applied to a network traffic segment are distributed across the computation kernels. Each of the computation kernels includes condition logic configured by microcode stored in an associated control store to evaluate a unique configured rule in the microcode to produce an associated output. A distribution circuit routes the network traffic segment to each of the plurality of microcode controlled state machines. An aggregation circuit generates a decision on which forwarding of the network traffic segment is based, where the decision is a logical combination of the associated output of each of the computation kernels.

33 Claims, 7 Drawing Sheets

OTHER PUBLICATIONS

Kay, U.S. Appl. No. 11/483,265, filed Jul. 7, 2006. Office Action mailed Aug. 13, 2009.
Kay, U.S. Appl. No. 11/483,265, filed Jul. 7, 2006. Office Action mailed Jan. 21, 2009.
Kay, U.S. Appl. No. 11;483,265, filed Jul. 7, 2006. Office Action mailed Feb. 3, 2010.
Kay, U.S. Appl. No. 11/483,196, filed Jul. 7, 2006. Office Action mailed Mar. 2, 2010.
Kay, U.S. Appl. No. 11/483,251, filed Jul. 7, 2006. Office Action mailed Jul. 8, 2010.
Kay, U.S. Appl. No. 11/483,251, filed Jul. 7, 2006. Office Action mailed Dec. 16, 2009.
Truong, Notice of Allowance mailed Dec. 14, 2010, U.S. Appl. No. 11/483,196, 9 pgs.
Truong, Notice of Allowance mailed Dec. 30, 2010, U.S. Appl. No. 11/483,251, 9 pgs.

* cited by examiner

Example of CWR Rule Engine Execution Sequence

| Addr State ID | Opcodes Operation and configuration | Operands Values to compare against | Next Addresses | Control |
|---|---|---|---|---|
| 0 | Initialization & clean-up of internal states (E.g. set global control for ECP override such that next (i.e. next address) is 5 if SEGMENT is a separator between packets)* | | | |
| 1 | Compare SEGMENT for equality | To Value: 'ab' | If equal: next = 2<br>otherwise: next = 1 | advance SEGMENT |
| 2 | Compare SEGMENT for equality | To Value: 'cd' | If equal: next = 3<br>otherwise: next = 1 | advance SEGMENT<br>same SEGMENT |
| 3 | Range check for the SEGMENT and Compare SEGMENT for equality | Range Lower Bound: 10<br>Range Upper Bound: 14<br>Equality operand: 'ab' | case in range: next = 4<br>case not in range & equal: next = 2<br>otherwise: next = 1 | advance SEGMENT<br>advance SEGMENT<br>same SEGMENT |
| 4 | End State Match | | Next = 0 | Done, match |
| 5 | End State NO Match | | Next = 0 | Done, NO match |

* when the SEGMENT is equal to a separator between packets ('--') it causes the next address to End State NO Match

*FIG. 6*

APPARATUS AND METHOD FOR FACILITATING NETWORK SECURITY

FIELD OF THE INVENTION

The present invention relates generally to processing of computer network traffic to facilitate network security and network monitoring applications. More particularly, this invention relates to facilitating optimized, cost-effective and flexible network security and network traffic monitoring features.

BACKGROUND OF THE INVENTION

The pervasive use of computer networks to increase productivity and to facilitate communication makes network security and network traffic monitoring critical concerns. Attacks targeting both individual hosts or local area networks (LANs) and the wide-area network (WAN) infrastructure are becoming increasingly sophisticated and frequent. Typically, a perimeter firewall is used to exclude unauthorized traffic from a customer LAN. Anti-virus (AV) software is used to eliminate viruses that may have entered the LAN and infected individual hosts. These existing preventive strategies, though simple and useful, have not prevented continuing damage in the billions of dollars from attacks on major organizations.

Both a firewall and AV software have limited monitoring, detection, and reaction capabilities for facilitating network security. A firewall filters out traffic from known unauthorized sources based on packet header. A firewall is typically not designed to diagnose or to react to a potential attack based on changes in network behavior or performance, or based on signatures hidden deep within packet contents. Also, a firewall typically does not provide flexibility in how to react beyond filtering of all traffic with specific header fields, such as source and destination addresses and ports. A firewall is usually deployed only at the LAN perimeter and therefore does not prevent propagation of attacks inside a LAN.

AV software runs primarily on hosts. Such software recognizes the digital signatures of known viruses but typically cannot detect new viruses, and is also not suited to monitoring of high-speed network traffic. Inherently, AV software has limited visibility of network traffic because AV software resides on a particular host.

It would be highly desirable to provide an apparatus with monitoring capabilities sufficiently comprehensive to enable detection of new types of attacks, and with reactive options proportionate to the threat posed by the attack.

The architecture of an apparatus with this advanced feature set desirably should overcome various hurdles. Current advanced security systems such as intrusion detection systems (IDS) typically rely on off the shelf computer system components, including central processing units (CPUs), memory, operating systems, and peripherals. Additional co-processors, such as network processors (NPs) and content addressable memories (CAMs), provide enhanced monitoring and detection capabilities at higher speeds, but at substantial additional cost. Hardware architectures that are not customized to this application often have non-deterministic performance that depends on the dynamic variation of input traffic patterns, making hardware resource use inefficient and validation difficult. The inability to guarantee performance is often a barrier to deployments in high speed networks where traffic has real time characteristics (e.g. interactive voice and media applications). Additional complexity, such as memory hierarchy, caches, or complex queuing structures, is required to support high bandwidth and/or low latency networks and to avoid unacceptable network performance degradation in corner case traffic scenarios. Inflexibility may result from limitations inherent to the components used, such as unoptimized instruction sets or unavailability of desired building block features. It would be desirable, given the importance of customer LAN performance, to provide a low cost, high speed, robust, and flexible apparatus with the advanced features needed for facilitation of network security traffic monitoring. Such an apparatus would enable a paradigm shift in network security and network traffic monitoring toward more rapid reaction to and tighter containment of attacks on networks that are not initially prevented.

SUMMARY OF THE INVENTION

One embodiment of the invention relates to an apparatus that facilitates network security and network traffic monitoring through processing of network traffic in accordance with provisioned rules and policies. One embodiment of the apparatus includes a set of microcode controlled state machines, each of which applies one or more rules to input network traffic. A distribution circuit routes individual network traffic segments derived from input network traffic to the set of microcode controlled state machines, so that each individual segment is processed in accordance with microcode stored in an associated control store. Each microcode controlled state machine includes a computation kernel operating in accordance with the microcode. An aggregation circuit routes the resulting processed individual network traffic segments in accordance with an output routing strategy to produce output network traffic corresponding to the original input network traffic. This embodiment provides an architectural framework well suited to a low cost, high speed, robust implementation of flexible, advanced network security and monitoring features.

Other aspects and embodiments of the invention are also contemplated. For example, other embodiments of the invention relate to methods of facilitating network security using one or more of the apparatuses described in the above embodiment. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of the invention, reference should be made to the following detailed description taken in conjunction with the accompanying drawings, in which:

FIG. 6 illustrates an example of an execution sequence of microcode instructions to implement a comparison rule.

DETAILED DESCRIPTION OF THE INVENTION

Figure 1:
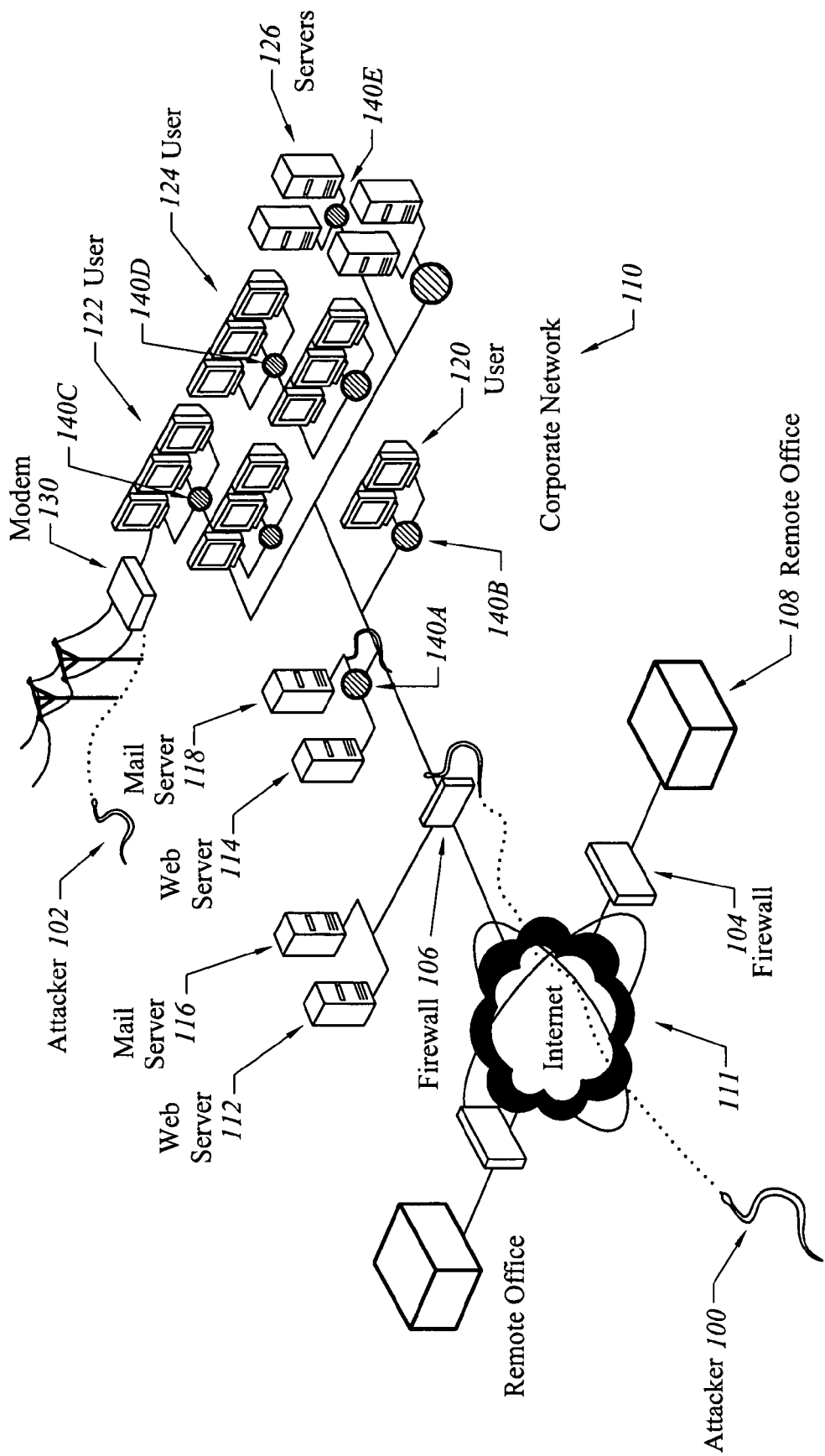
FIG. 1 illustrates a network with representative locations at which embodiments of the invention can be deployed.

FIG. 1 illustrates a network with representative locations at which embodiments of the invention can be deployed. A main corporate network 110 is separated from the Internet 111 by a firewall 106. A remote office 108 is separated from the Internet by a firewall 104. The network 110 and the remote office 108 can be connected by various technologies known in the art, such as virtual private network (VPN) client software. The partitioning of network 110 allows external users to access a web server 112 and a mail server 116 without traversal of the firewall 106, and prevents unauthorized external users from accessing the remainder of the network 110. The portion of the network 110 protected by the firewall 106 includes client machines (users) 120, 122, and 124, general servers 126, web server 114, and mail server 118.

The firewalls 104 and 106 aim to prevent attacks by unauthorized users. However, various types of attacks, represented by an attacker 100, can penetrate the firewall 106. Once the firewall 106 is breached, the infection spreads freely throughout the network 110. In addition, access to the network 110 by an attacker 102 is further facilitated by any unprotected path into the network 110 that does not traverse the firewall 106, such as via a modem 130, which is traversed by attacker 102.

An apparatus positioned within the firewall perimeter of the network 110 is needed to prevent infections of one portion of the network 110 from spreading to other portions of the network 110. FIG. 1 shows representative locations for the apparatus 140 at 140A, 140B, 140C, 140D, and 140E. The apparatus 140A separates the web server 114 and the mail server 118 from the rest of the network 110. The apparatuses 140B, 140C, and 140D separate the users 120, 122, and 124, respectively, from the rest of the network 110. The apparatus 140E separates the servers 126 from the rest of the network 110. If it is necessary to allow access to the network 110 via the modem 130, the apparatus 140C is used to prevent the attacker 102 from accessing portions of the network 110 beyond the user 122.

To help prevent or limit an attack, it is contemplated that embodiments of the invention enable network monitoring that may be sufficiently comprehensive to expose new types of attacks not recognized by firewalls or AV software. Effective monitoring requires extensive collection of network statistics to enable network behavioral analysis. Collection of statistics may be supplemented by snapshot copying of all collected statistics at an instant, or aggregation and correlation of information from multiple apparatuses to provide a clear view of network status and behavior. Embodiments of the invention may facilitate network security solely through monitoring.

In addition, attacks can be prevented proactively by provisioning the apparatus with rules to prevent malicious code from reaching a vulnerable portion of the network. A rule is a specific criterion used by the apparatus to determine whether it must react to a potential breach of network security. One type of rule is signature-based. Signatures are sequences of bits anywhere within the digital content of traffic that indicate the presence of a virus or other malicious traffic. The sequences of bits may be entirely invariant, or may contain portions that are wildcards inessential to rule evaluation. A signature could appear in the header or payload of individual network packets, or across a sequence of packets. A signature may span one or more packet headers and corresponding payloads, and therefore deep packet inspection is required. Stream inspection is required to discover signatures across a sequence of packets. Both types of inspection are required for total visibility of various types of network traffic.

A second type of rule is behavioral. Two types of behavioral rules are local and network-based behavioral rules. It is contemplated that local behavioral rules can be used to detect changes that can be measured locally at an apparatus 140. These changes include but are not limited to changes in the volume of traffic or in the balance of inbound and outbound traffic, such as requests and responses, passing through the apparatus 140. Network-based behavioral rules can be used to detect changes in the network that can be measured in conjunction with other network devices, including but not limited to apparatus 140. An example of such a rule is the total traffic volume averaged across multiple points in the network during a specific time period compared to a maximum threshold. Another example is the total number of events of a specific type, such as network error indications, that have occurred across the network during a specific time period, again compared to a maximum threshold. Monitoring of collected statistics required for rule evaluation is important because a new type of attack can be detected based on its impact on network performance or behavior, even when its signature is unknown.

A third type of rule is both signature-based and behavioral. An example of such a rule is the total number of packets containing a specific signature that have passed through an apparatus 140 during a specific time period during the day compared to a maximum and/or minimum threshold.

After an attack is detected, embodiments of the invention enable a variety of reactions beyond simply filtering or dropping packets with a known signature, as would be done by a firewall. For example, duplication of traffic or re-direction of traffic to a different physical path than other traffic allows for in-depth examination or quarantine of suspicious traffic without immediate dropping of such traffic. Further, limiting the rate of specific traffic types or events per time unit can protect against attacks such as denial of service by limiting the number of packets or requests that reach the portion of the network under attack. The best possible network performance under normal circumstances can be supported with multilevel policies. These policies combine rules and their dependencies, with more restrictive policies applied when looser policies indicate that an attack may be in progress. Policy enforcement is bidirectional and therefore it can prevent an infection from entering or escaping a portion of a LAN.

Figure 2:
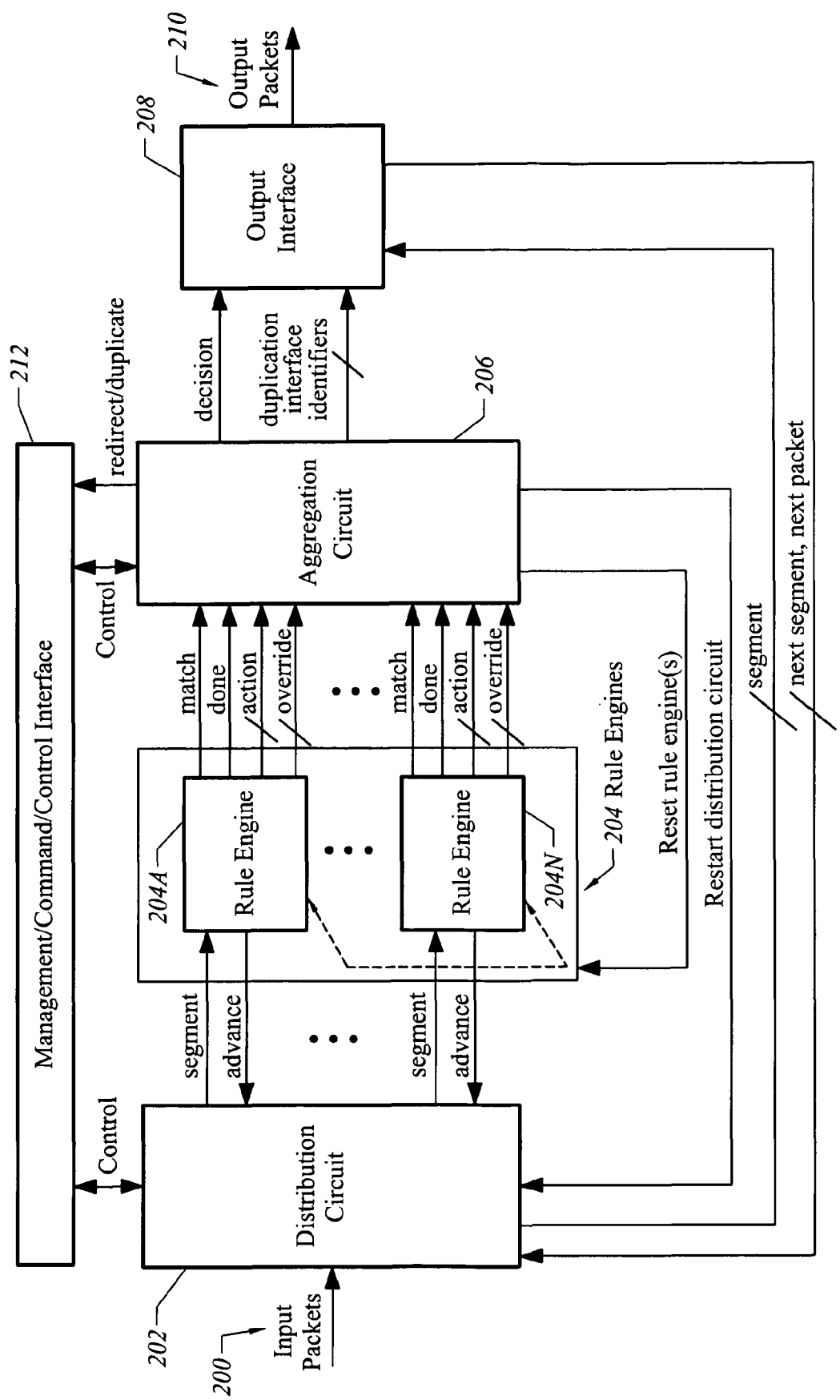
FIG. 2 illustrates a logical block diagram of the architecture of embodiments of the invention.

FIG. 2 illustrates a logical block diagram of the architecture of an embodiment of the invention. The apparatus can be deployed as a "bump in the wire" with three (or more) interfaces. In one embodiment, there is one interface for input network traffic 200, a second interface for output network traffic 210, and a third interface 212 for output network traffic that has been duplicated or re-directed, or for management communications. Input packets 200 from the network 110 first enter a distribution circuit 202. In the illustrated embodiment, the distribution circuit 202 divides the input packets 200 into traffic segments. In another embodiment, the input packets 200 are divided into segments by a pre-processor that may precede the distribution circuit. This pre-processor, which may be a custom or standard protocol core, can also provide packet fragmentation/re-assembly and/or packet re-ordering functionality. A traffic segment is typically a fixed-length sequence of bytes derived from a single input packet, in the same order as the bytes that entered the distribution circuit 202. A traffic segment is not to be confused with a Transmission Control Protocol (TCP) segment, which could include multiple packets. If a packet does not have enough bytes remaining to fill a traffic segment, the remaining bytes of the traffic segment are unused. Each byte of a traffic segment may be associated with a control bit that serves as a validity indicator, with unused bytes marked as invalid.

In the embodiment illustrated in FIG. 2, each traffic segment is routed in parallel for processing by each rule engine of a set of rule engines 204A-204N, hereinafter referred to as

204. The distribution circuit 202 also holds each of the input packets 200 until an output interface 208 indicates to the distribution circuit 202 whether the packet should be forwarded or deleted, for example by skipping. These segments are of a width in bytes equal to the bus width for segments between the distribution circuit 202 and each rule engine 204, and between the distribution circuit 202 and the output interface 208.

Each rule engine 204 asserts an advance indication to the distribution circuit 202 when it is ready for additional traffic segments from the distribution circuit 202. When all rule engines 204 have asserted their advance lines, the distribution circuit 202 sends the next traffic segment to all rule engines 204. Each of the individual rule engines 204 executes a configured rule. In one embodiment, each rule engine 204 evaluates to a value of true or false and asserts a done line at the end of each packet.

After a rule engine 204 has completed evaluation of a rule, it notifies the aggregation circuit 206 of the result. If the rule evaluates to true, the match line to the aggregation circuit 206 is asserted. When evaluation of a rule is completed for a data portion, which can be the set of traffic segments obtained from the division of one or more input packets 200, the done line is asserted. The action lines indicate to the aggregation circuit 206 whether to redirect or to duplicate the data segment, and allow future scalability to additional interfaces for duplication or redirect. When the output of a rule engine 204A is to override the outputs of a subset of rule engines 204B-204N, the rule engine 204A may assert override lines corresponding to that subset of rule engines 204B-204N. In another embodiment, the rule engine 204A may assert one override line that overrides rule engines 204B-204N.

The aggregation circuit 206 includes output logic that enforces policies, which are sets of rules and the logical, causal, and/or temporal relationship between them. The aggregation circuit 206 waits until all rule engines 204 assert their corresponding done bits before making a decision based on the outputs of all rule engines 204. The decision, typically to drop, forward or duplicate the packet, is passed to the output interface 208, along with a duplication interface identifier. The duplication interface identifier indicates to the output interface 208 if the packet is being duplicated. The aggregation circuit 206 asserts a restart to the distribution circuit 202 when the aggregation circuit 206 determines that the distribution circuit 202 can skip all remaining segments of the current packet and go directly to processing of the next packet. It can be desirable for the aggregation circuit 206 to also support duplication or re-direction of traffic to the management interface 212.

When a packet is to be forwarded, the output interface 208 requests via the next packet line that the next packet be sent to it from the distribution circuit 202. During the transfer of the next packet, the output interface 208 asserts a next segment indication to the distribution circuit 202 when it is ready for one or more additional traffic segments from the distribution circuit 202. In one embodiment, when the output interface 208 receives traffic segments from the distribution circuit 202, the output interface 208 may buffer some or all of the packet, as necessary, before transmitting it as an output packet 210. This depends on the post-processing functions that it may need to perform, which may include, but are not restricted to, encryption. In another embodiment, segments of the packet may be sent out as they are received by output interface 208. In that mode of operation, if the decision of the aggregation circuit 206 is to drop the packet, then the packet is truncated and becomes practically unusable by connected equipment receiving the packet.

For packet and stream processing, there need not be involvement of any general purpose central processing unit (CPU). There is a general management/command/control interface available for external equipment, typically containing a CPU, to control the distribution circuit 202, the aggregation circuit 206, and all rule engines 204 via control of the aggregation circuit 206.

An embodiment of a rule engine 204 is a microcode controlled state machine that executes a configured behavioral or signature-based rule. A rule is compiled to a set of bits, or microcode, that is used to program the microcode controlled state machine and associated configuration registers. Each microcode controlled state machine includes a computation kernel operating in accordance with microcode stored in an associated control store. The microcode controlled state machines configure an optimized data path to perform such operations as equality, masked equality, and range inclusion/exclusion operations on each traffic segment. The data path comprises shallow stages whose implementation requires only a few logic levels, thus enabling a very high frequency design.

The set of rule engines 204 can be implemented as a pipelined fabric of microcode controlled state machines that operate concurrently and collaboratively on each traffic segment. This regular structure lends itself to creation of high capacity, parallel designs through replication of a small number of fundamental building blocks. It also provides an ability to preserve state information, such as TCP connection information, locally in the relevant microcode controlled state machine as part of its state. In contrast to the typical approach in firewalls of preserving state information of all connections in shared memory, this fabric also allows for state information to be stored as a local state of a single microcode controlled state machine. However, the architecture also supports a global state table (that may contain connection information) that is globally available to all rule engines 204. The global state table may be maintained in a CAM or an external memory, and may be implemented as on-chip memory. If in a CAM or an external memory, the global state table may be accessed by the rule engines 204 via the management interface 212, which is responsible for a controller that maintains the state information and presents relevant state information pertaining to the current packet to all the rule engines. The, information in the global state table may be simultaneously accessed by the rule engines 204, such as via hardware signal lines to each rule engine 204. In this embodiment, no clock cycles are wasted managing queues of requests for lookups to a CAM or an external memory. The global state table may be updated on a per packet basis by dedicated hardware. This architecture, along with its associated instruction set, can also be customized and optimized. This allows for efficient, easily configurable, and unified header processing and deep inspection of packet payloads.

The aggregation circuit 206 includes output logic that enforces policies. A policy may be a simple collection of rules related using Boolean logic. In one embodiment, the aggregation circuit 206 aggregates the outputs of individual blocks, for example expressed as a Boolean OR of several rules. If any of these multiple rules are true, then a configured action is taken, such as dropping the packet. The aggregation policy can be implemented as a tree, where each tree node can be configured to function as a logical OR or AND. A policy can be configured to be a complicated composite relationship between rules, such as a sum of products, and/or a causal or temporal relationship. The aggregation logic can implement any combinatorial or sequential logic.

In one embodiment, the aggregation circuit 206 generates control signals to activate and deactivate a subset of one or more of the set of rule engines 204. The aggregation logic can also reset or provide rule feedback to the subset of rule engines 204, and can set parameters used by the distribution circuit 202. A rule engine 204 can include logic and can generate control signals to directly activate and deactivate one or more other rule engines.

FIG. 2 illustrates an example of a parametric architecture, which enables scaling of key performance metrics, such as throughput, with design parameters, such as traffic segment width, without changing the fundamental structure of the architecture. Wider traffic segments, which correspond to a wider data path, can be used to increase overall system throughput by pushing more bits per hardware clock cycle through the apparatus. It is possible to tune the data path width and to make a trade-off between the use of silicon resources (gates) and the operating frequency of the apparatus. The worst-case throughput through the apparatus can be accurately calculated by multiplying the traffic segment width by the number of clock cycles per second divided by the worst-case number of clock cycles per traffic segment. For typical applications, the worst-case number of clock cycles per traffic segment is less than five, preferably two. The worst-case latency can be accurately calculated depending on whether the forwarding policy is store and forward, or cut-through. For store and forward, the worst case latency is directly proportional to the quotient of the number of segments in two maximum size packets divided by the clock frequency. The processing time is linear in the number of traffic segments in a packet.

The architecture illustrated in FIG. 2 is designed to be optimal, specifically, for network security and monitoring applications. However, this architecture is also general enough to implement general purpose pattern matching, including packet classification, deep inspection, and on-the-fly database applications. The common denominator is the concept of processing data one segment at a time, where the size of a segment is a design parameter of a parametric architecture.

Rules used by rule engines 204 can be specified in several ways, including but not limited to bit configuration of the hardware, use of low level assembler, translation from existing languages used by common intrusion detection systems (IDS) and firewalls, or use of a high level language. In one embodiment, low level assembler is used, based on a unique and proprietary instruction set architecture (ISA) corresponding to an underlying hardware architecture optimized for network security applications. In another embodiment, a high level, tailored rule definition language is used, based on a proprietary high level language for the Stream and Packet Inspection Front End (SPIFE). Some examples of rules in a high level rule definition language include:

drop inbound eth:ip:tcp ip.src=1.2.3.4, tcp.dport=80;
Meaning: drop TCP packets that are coming inbound (from the external network toward the protected segment), which have an IP source address of 1.2.3.4 and a destination port 80 (http).

drop inbound eth:ip:udp payload: "malicious";
Meaning: drop User Datagram Protocol (UDP) packets that are coming inbound (from the external network toward the protected segment) if their payload contains the keyword "malicious".

drop inbound eth:ip:udp payload: "malic*ious" [ignorecase];
Meaning: drop User Datagram Protocol (UDP) packets that are coming inbound (from the external network toward the protected segment) if their payload includes the keyword "malicious" where any number of characters separates the "c" from the "i". The payload is case-insensitive, such that, for example, "Malicious", "mAliCious", and "MALICIOUS" are dropped.

count all inbound eth:ip:icmp icmp.type=PING_REPLY;
Meaning: count Internet Control Message Protocol (ICMP) ping-reply packets sent via the IP and Ethernet protocol layers.

duplicate all inbound eth:ip:icmp icmp.type=PING_REPLY;
Meaning: duplicate inbound ICMP ping-reply packets sent via the IP and Ethernet protocol layers to the third interface without interfering with the normal packet flow from the first interface to the second interface, or from the second interface to the first interface.

redirect all inbound eth:ip:icmp icmp.type=PING_REPLY;
Meaning: redirect inbound ICMP ping-reply packets sent via the IP and Ethernet protocol layers to the third interface.

Figure 3:
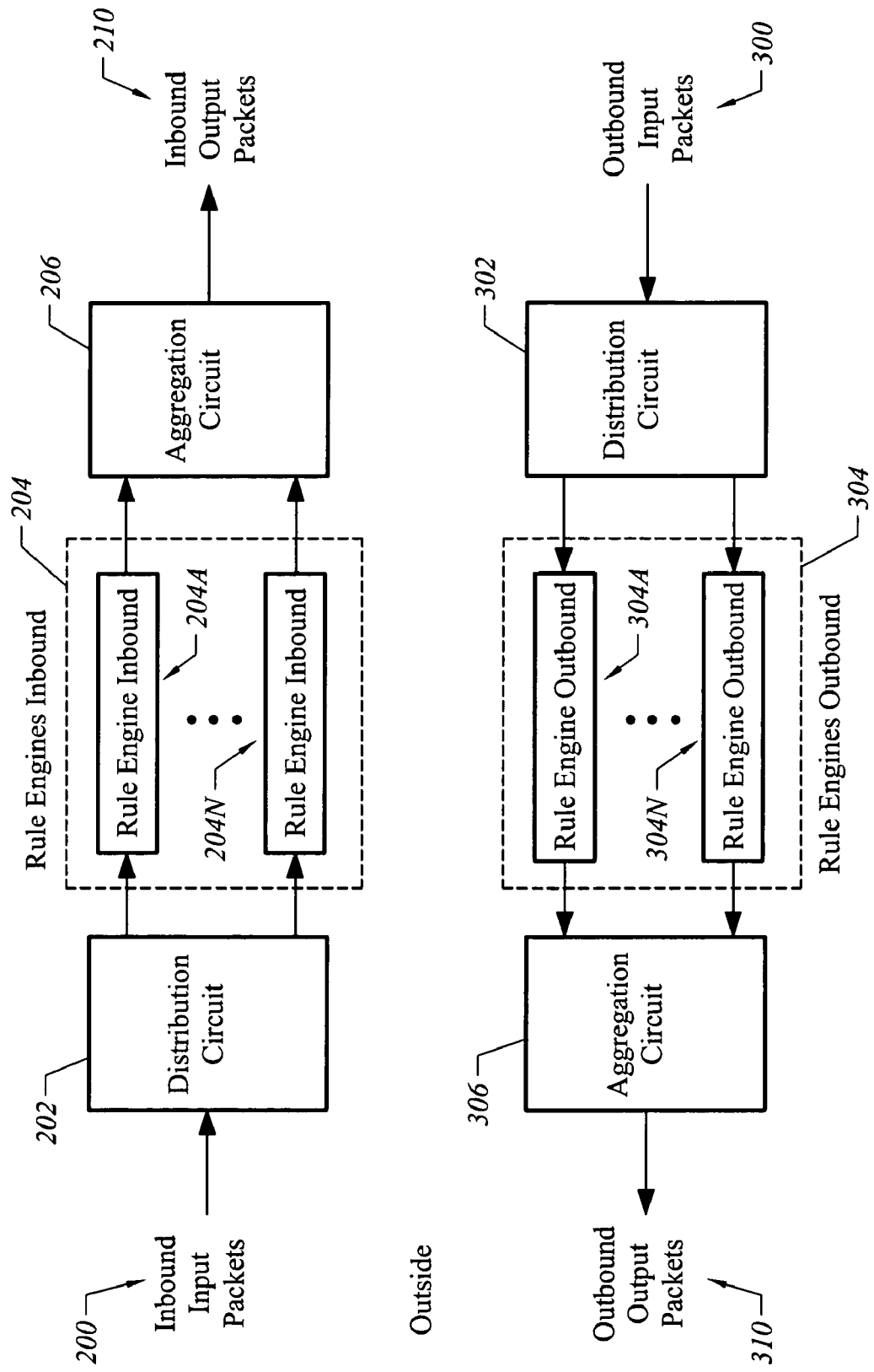
FIG. 3 illustrates the use of the architecture of FIG. 2 for bidirectional applications.

FIG. 3 illustrates the use of the architecture of FIG. 2 for bidirectional applications. One example is client-server applications, for which it is desirable to monitor bidirectional protocol behaviors or event triggering. If the server is outside the portion of the network protected by the apparatus and the client is inside that portion of the network, traffic from the server is inbound, and requests and responses from the client are outbound. Inbound input packets 200 are processed by the distribution circuit 202, the set of rule engines 204, and the aggregation circuit 206. The output interface 208 is not shown in FIG. 3 for simplicity. The distribution circuit 202, the set of rule engines 204, and the aggregation circuit 206 form a first path in the inbound, or first, direction, and can be aligned with a distinct distribution circuit 302, set of rule engines 304, and aggregation circuit 306 that form a second path in an outbound, or second, direction different from, such as opposite to, the first direction. Alignment in this context is conceptual, and does not imply any restrictions on the physical positioning of these blocks relative to each other in an implementation. To handle bidirectional applications, it can be desirable for the set of rule engines 204 to exchange control information with the set of rule engines 304. In another embodiment, each rule engine 204 could dynamically alternate between processing traffic from the first path and the second path. This dynamic alteration may be controlled by microcode, and may also be controlled by the configuration bits of the rule engine 204. The rule engines 204 may alternate between processing traffic from the first path and the second path independently and/or as a group.

Figure 4:
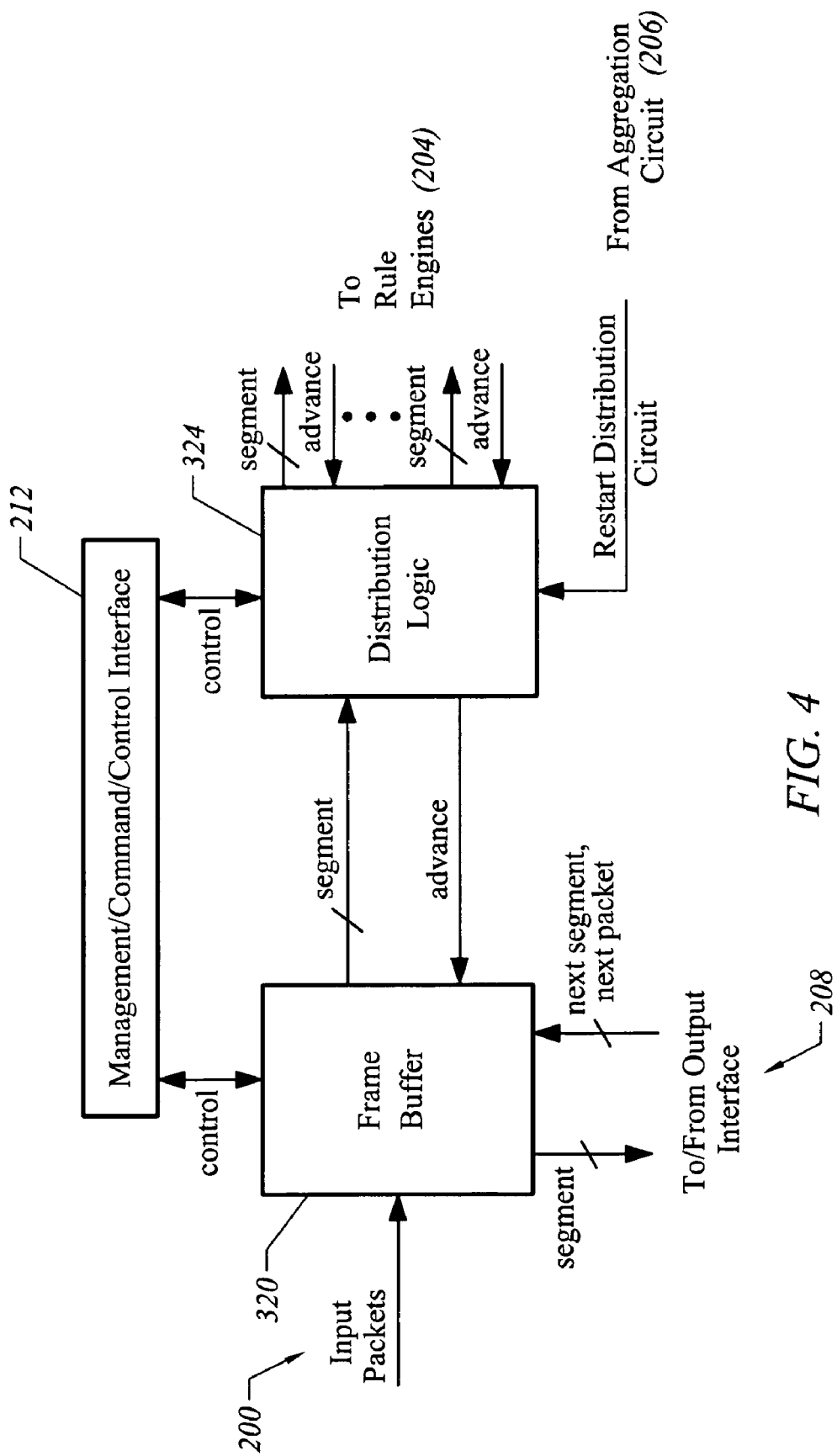
FIG. 4 illustrates the internal architecture of the distribution circuit shown in FIG. 2.

FIG. 4 illustrates one embodiment of the internal architecture of the distribution circuit 202 shown in FIG. 2. The input packets 200 enter a frame buffer 320. In this embodiment, the buffer 320 is a FIFO buffer, and is logically organized in segment sizes equal to the width of the data path through the apparatus. The input packets 200 may have already been partitioned into traffic segments by a pre-processor, in which case the frame buffer 320 may not be required. Otherwise, the input packets 200 are placed into the frame buffer 320 with a separator between the input packets 200. The frame buffer 320 logically has one write port, for the input packets, and two read ports, one for a distribution logic block 324 and the other for the output interface 208. A standard implementation of such a buffer uses two separate memory blocks, such that one is near the input interface and one is near the output interface. In a store-and-forward implementation, a packet remains stored in the frame buffer 320 until a decision by the rule engines 204 has been communicated by the aggregation circuit 206 to the output interface 208, causing the output interface 208 to assert the next packet line. In a cut-through implementation, each traffic segment of a packet is forwarded without delay to the output interface 208. A kill signal may be sent to the output interface 208 to cause the output interface 208 to corrupt a portion of the packet in order to cause the packet to be discarded by the devices on the receiving end in the network. Both the frame buffer 320 and the distribution logic 324 can have management/command/control interfaces.

The distribution logic 324 grabs a data segment out of the frame buffer 320 when all of the connected rule engines 204 are ready for the next segment of data, as indicated by their de-assertion of their advance control lines to the distribution logic 324. If one or more of the rule engines 204 is not ready, the distribution logic 324 de-asserts the advance control line to the frame buffer 320 and waits until all of the rule engines 204 are ready. The distribution logic 324 receives the restart from the aggregation circuit 206, described in FIG. 2, that causes the distribution logic 324 to skip all remaining segments of the current packet and go directly to processing of the next packet.

Figure 5:
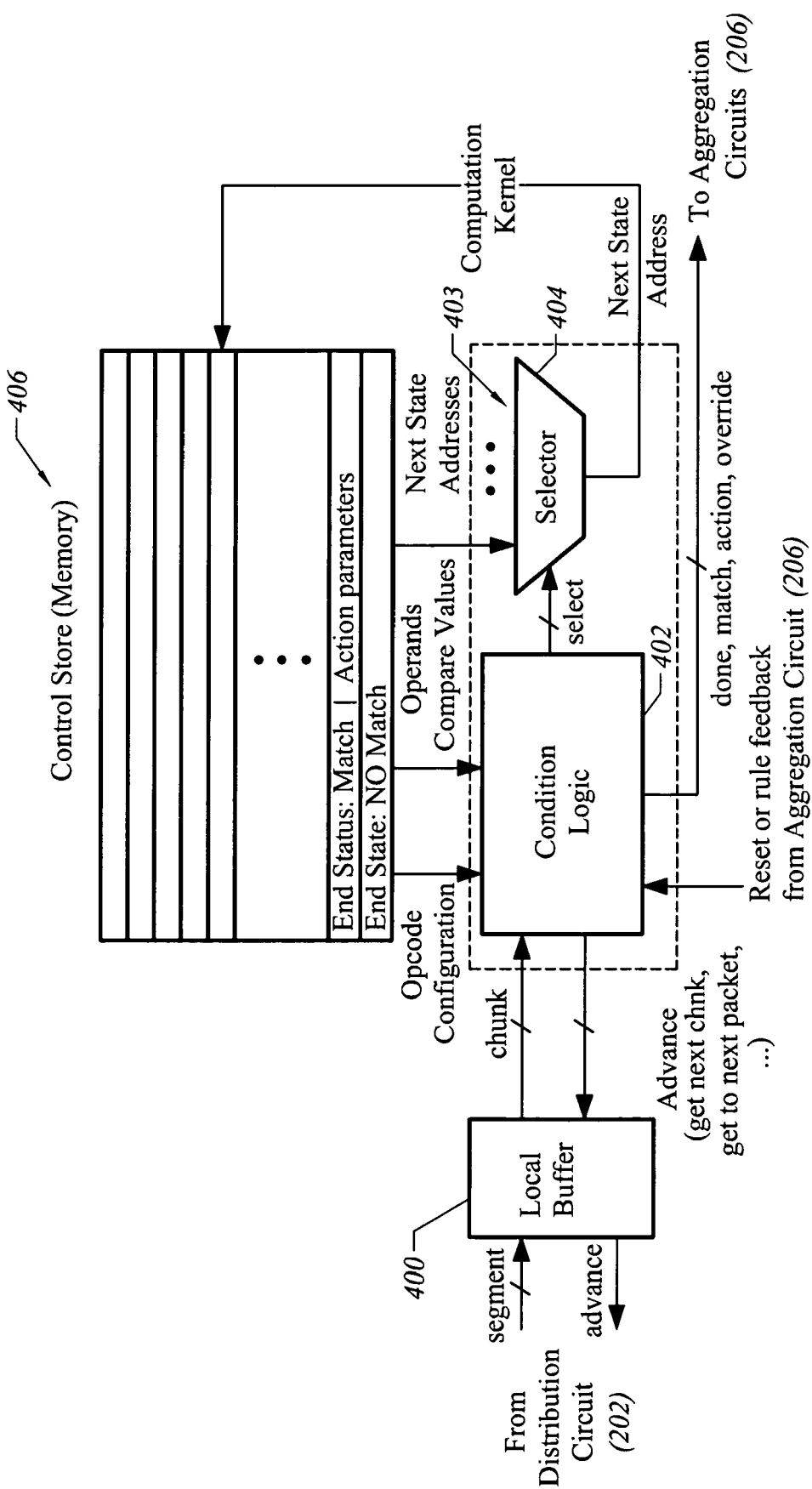
FIG. 5 illustrates the internal architecture of the rule engine shown in FIG. 2, based on a microcode controlled state machine.

FIG. 5 illustrates the internal design of a rule engine 204 based on a microcode controlled state machine configured in accordance with an embodiment of the invention. The design is based on a custom programmable state machine with independent local memory. The memory is typically static random access memory (SRAM), but can be of a different type. Programming the state machine is done by writing content to a control store memory 406. The functionality of the rule engine 204 is changed by writing new microcode to the control store 406. Bus implementations to enable reading from and writing to distributed local memory are well known in the art. It is also contemplated that the rule engine 204 can be implemented in various ways, such as using application specific integrated circuits (ASICs) or programmable logic devices (PLDs).

Each rule engine 204 may contain a small first-in first-out (FIFO) local buffer 400 to hold traffic segments received from the distribution circuit 202 while each rule engine 204 is processing a preceding segment. If present, this buffer indicates to the distribution logic via the advance line when it is able to accept additional segments.

The purpose of the local buffer is to prevent periods of time during which no data is available for processing by a rule engine 204 (stalls). The local buffer can be thought of as a fixed length window that slides over the input data. A traffic segment is provided to each rule engine 204 by the distribution circuit 202 when all rule engines 204 have asserted their advance lines, which indicates that the local buffers of all rule engines 204 have space for the traffic segment. Traffic segments already in the local buffers of rule engines 204 are available for processing in parallel by all rule engines 204. As a result, a rule engine 204 that has completed processing of a first traffic segment can immediately pull the next traffic segment from the local buffer, without being stalled by another rule engine 204 that has not yet completed processing of the first segment. Since there is a maximum number of comparisons, and thus processing cycles, required to apply a rule to a traffic segment, the size of this local buffer can be bounded. Typically, processing of a traffic segment by a rule engine 204 requires no more than two cycles. If two cycles is then set as the number of processing cycles for any traffic segment, sliding the window every two cycles by the number of bytes required to include the next traffic segment guarantees that none of the local buffers become full.

A condition logic block 402 indicates via an advance line when it is ready to receive the next segment of data from the input buffer 400 or directly from the distribution circuit 202. The condition logic 402 is configured by each line of microcode to perform one or more comparisons on the current segment and, based on the comparisons, to select the next state using a selector 404. The condition logic 402 and the selector 404 are included within a computation kernel 403. The condition logic 402 implements combinatorial operations as well as sequential logic, which depends on its internal state. In this embodiment, the next state is the address of the next microcode instruction to execute. In addition, the condition logic 402 sets the done, match, action, and override indications provided to the aggregation circuit 206. The aggregation logic can generate control signals to activate and deactivate the condition logic 402, or to provide rule feedback to the condition logic 402.

Each microcode line in the control store 406 determines what kind of comparisons to perform on the current traffic segment. Based on the comparison results, the microcode line also provides the address of the next microcode line to execute. In one embodiment, each line in the control store 406 includes four types of information:

1. Control bits (such as opcodes or configuration bits) that determine what type of comparisons are performed by the condition logic 402, and what internal state should be stored in internal state variables (flops and registers).
2. Values used by the comparisons. Comparison types include equality, membership in a set, range comparison, and more complex operations, such as counter comparisons that indicate whether a bit sequence has occurred more than 3 times in the previous 10 segments.
3. Addresses of subsequent addresses to execute based on the output of the condition logic 402. Depending on the result of the condition logic 402, one of multiple next addresses may be selected. Allowing more than one next address allows greater flexibility for implementing complex conditions, while saving clock cycles.
4. Control of internal state and primary outputs of the rule engine 204. For example, this can include whether to assert the done line, whether to advance to the next segment in the packet or to stay for another comparison involving the current segment, or whether to move immediately to the end of the current packet.

These different types of comparisons, along with the architecture, enable processing of both individual packets and streams of packets by the set of rule engines 204. A rule engine 204 can process a stream without actually fully reconstructing it in external system memory. Based on the microcode instructions, the rule engine 204 can make decisions that are based on a sequence of events that happen over time and are encapsulated in separate packets.

FIG. 6 shows an example of an execution sequence of microcode instructions to implement a comparison rule. The sequence of searches for a four-byte sequence "abcd" in two successive segments (each assumed to be 2 bytes), followed by a two-byte sequence with a value between "10" and "14" inclusive. For a twenty byte packet that is represented symbolically as "1234yzwxabcd12345678", the actual state transitions from the start of the packet until a decision is 0->1->1->1->1->1->2->3->4. When the rule engine 204 reaches state 4, it asserts both the done and match outputs to the aggregation circuit 206 in FIG. 2. If the packet data does not include the desired content, then as soon as the SEGMENT equals the two-byte packet separator "- -", there is an automatic transition to state 5. In state 5, the rule engine 204 asserts the done line and deasserts the match line.

The number of operations that can be executed in parallel on SEGMENT and their type depends on the specific hardware implementation, including the control store memory line width. This example assumes that the comparison of SEGMENT against a given value and the check of whether SEGMENT is within a given range can be done in parallel. Otherwise, the operations can be done in two separate consecutive clock cycles. For example, state 3 makes two checks in parallel and assumes that the three next address values can be specified in one control store memory line.

Figure 7:
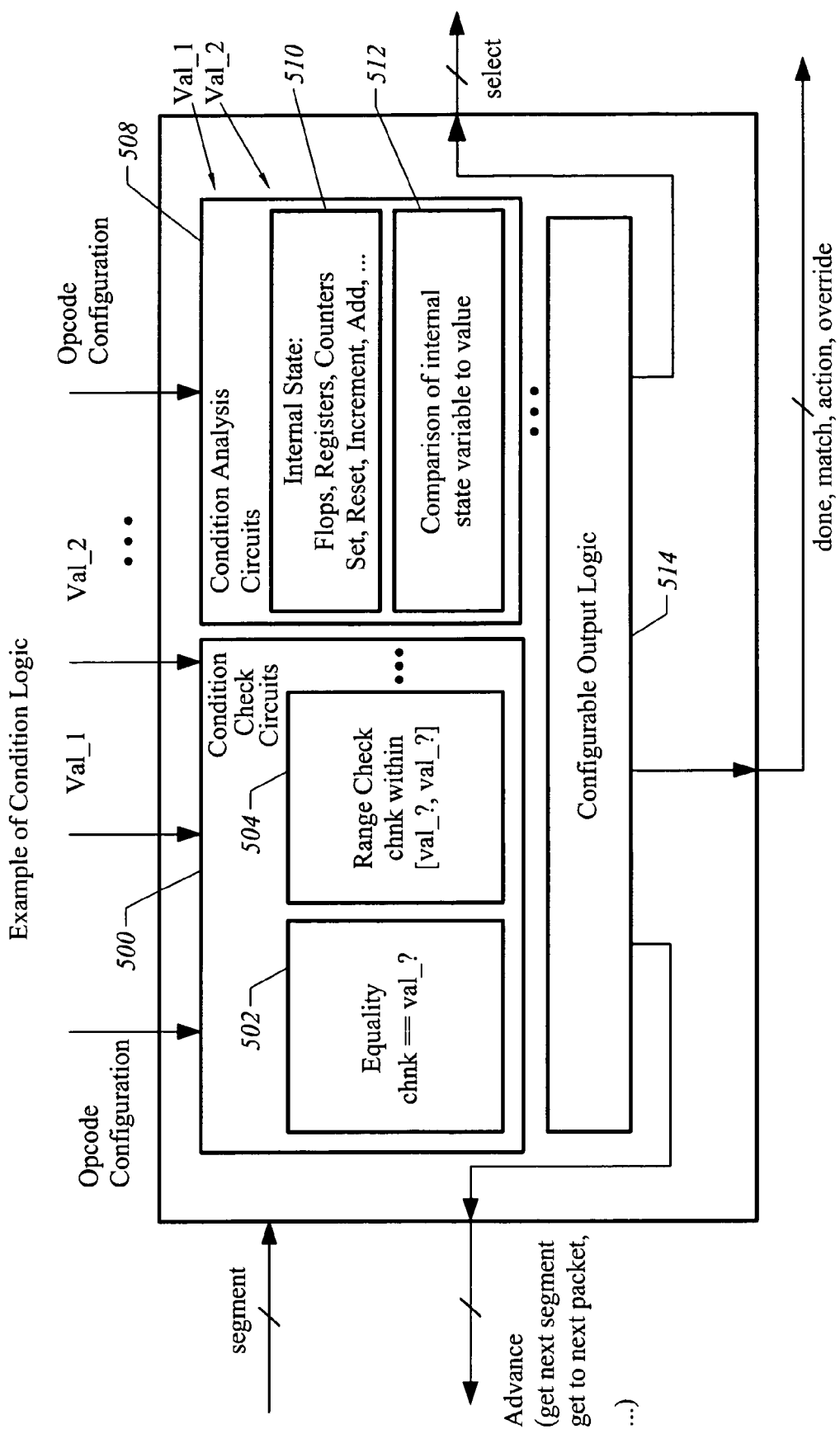
FIG. 7 illustrates an example of the internal architecture of the condition logic shown in FIG. 5.

FIG. 7 illustrates an example of the implementation of condition logic in FIG. 5. Based on the segment input from the local buffer 400 and the opcode and configuration bits from the control store 406, a set of comparisons can be done in parallel between the segment, operands, and internal state variables. An operand is a configured value used for a comparison. An internal state variable includes values stored in flops, registers, or counters, such as statistics. These values include the result of comparisons between stored values, such as the number of times that the value in a first counter has exceeded the value in a second counter. In this embodiment, each condition logic block 402 has two counters that are dedicated to count the number of packets and the total number of segments (or bytes) that have been processed by the microcode in the control store 406. There are also counters and status registers associated with the input, output, and management interfaces. Comparisons can be made between registers and local counters and/or global counters.

Each sub-block within FIG. 7 implements a specific comparison. Operand to data comparisons such as an equality 502 and a range check 504 are implemented by condition check circuits 500, which are used to evaluate signature-based rules. Modification of internal state stored in flops, registers, or counters 510 and comparisons between an internal state variable and an operand (or another internal state variable/register or a global state variable/counter) 512 are implemented by condition analysis circuits 508, which can be used to evaluate behavioral rules or to collect statistics. There is an automatic update of internal states, such as the number of bytes of the current packet that have been processed so far, as specified by the opcode and configuration inputs. The results of the parallel sub-block comparisons are compounded by a block within a configurable output logic block 514 (Boolean or sequential or both.) The select of the next address used by the selector 404 and the outputs of the microcode controlled state machines visible to the aggregation circuit 206 are set by the configurable output logic 514.

Embodiments of the invention are cost-effective, simple to use, manageable, and flexible. With a unified algorithm and block design across the distribution circuit 202, the rule engines 204, and the aggregation circuit 206, the apparatus performs both header analysis and deep packet inspection functions without the use of multiple, costly co-processors such as NPs for header processing and a CAM for pattern matching. The apparatus can be incrementally deployed to balance risk with the available budget. The apparatus provides an interface 212 for management and monitoring of the network and configuration of its specialized features, and may also support the use of pre-processors and post-processors for specific customer needs.

Embodiments of the invention also have predictable and easily verifiable performance, based on its architecture. The implementation of the set of rule engines 204 as a pipelined fabric of microcode state machines that operate concurrently and collaboratively ensures that the worst-case throughput and latency through the apparatus can be calculated and bounded. As a result, accurate predictions can be made about when the apparatus can run at wire speed. Wire speed operation is fast enough to process, without unintended traffic loss, the worst case combination of input packet size and packet rate in packets per second given maximum rule complexity.

Also, since there is a deterministic worst-case number of clock cycles for processing of any traffic segment by a rule engine 204, the apparatus can have small, bounded processing delay across mixes of traffic types, packet sizes, and rule complexity. Small, bounded delay means that simple, on-chip buffers can be used by the apparatus rather than external memory or caches that may require complex memory hierarchy or queuing structures. The use of simple, on-chip buffers not only increases apparatus performance through efficient and optimal use of hardware resources such as gates and memory elements, but also avoids corner cases related to various traffic patterns. It also enables validation using formal verification and structural coverage, which reduces the likelihood of design escapes and errors.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus to facilitate network security and traffic monitoring for input network traffic, comprising:
 a plurality of microcode controlled state machines, each of said plurality of microcode controlled state machines including a computation kernel, wherein a plurality of rules to be applied to a network traffic segment are distributed across said computation kernels such that each of said computation kernels includes condition logic configured by microcode stored in an associated control store to evaluate evaluates a unique configured rule in said microcode stored in an associated control store to produce an associated output, wherein said condition logic includes:
 a condition analysis circuit configured to compare a first value of an internal state variable stored by said condition logic and updated based on network traffic conditions to a second value stored by said condition logic to evaluate a behavioral rule associated with network traffic conditions;
 a distribution circuit to route said network traffic segment to each of said plurality of microcode controlled state machines;
 an aggregation circuit to generate a decision on which forwarding of said network traffic segment is based, wherein said decision is a logical combination of said associated output of each of said computation kernels; and
 an output circuit, wherein said distribution circuit provides said network traffic segment directly to said output circuit for forwarding, bypassing said plurality of microcode controlled state machines, in response to receiving said decision from said aggregation circuit.

2. The apparatus of claim 1 wherein each of said plurality of microcode controlled state machines has a local buffer to selectively buffer said individual network traffic segments prior to processing by said computational kernel.

3. The apparatus of claim 2 wherein said local buffers of said plurality of microcode controlled state machines operate synchronously to define a processing window for said individual network traffic segments.

4. The apparatus of claim 1 wherein each of said plurality of microcode controlled state machines has a computation kernel including a condition analysis circuit to process an internal state value and microcode from said associated control store.

5. The apparatus of claim 1 wherein said condition analysis circuit generates an output specifying whether conditions defined by said microcode are satisfied.

6. The apparatus of claim 5 wherein said condition analysis circuit generates an output specifying whether a comparison between a microcode stored internal state variable and an internal state value from said associated control store is satisfied.

7. The apparatus of claim 1 wherein each of said plurality of microcode controlled state machines has a computation kernel including a condition check circuit to process a network traffic segment and microcode from said associated control store.

8. The apparatus of claim 7 wherein said condition check circuit generates an output specifying whether conditions defined by said microcode are satisfied.

9. The apparatus of claim 8 wherein said condition check circuit generates an output specifying whether a comparison between a microcode stored operand and data from said traffic segment is satisfied.

10. The apparatus of claim 1 wherein each of said plurality of microcode controlled state machines has a circuit to process a portion of said network traffic segment, output from a condition analysis circuit and output from a condition check circuit.

11. The apparatus of claim 10 wherein each of said plurality of microcode controlled state machines has a circuit to implement a microcode specified Boolean logic operation.

12. The apparatus claim 10 wherein said circuit generates a next address value.

13. The apparatus of claim 1 wherein said plurality of microcode controlled state machines apply signature-based rules specified by said microcode.

14. The apparatus of claim 1 wherein said plurality of microcode controlled state machines operate collaboratively.

15. The apparatus of claim 14 wherein said plurality of microcode controlled state machines operate to activate and deactivate selected ones of said plurality of microcode controlled state machines.

16. The apparatus of claim 1 wherein said distribution circuit divides said input network traffic into said individual network traffic segments.

17. The apparatus of claim 1 further comprising a preprocessor circuit to divide said input network traffic into said individual network traffic segments.

18. The apparatus of claim 1 wherein said distribution circuit includes at least one frame buffer.

19. The apparatus of claim 1 wherein said at least one frame buffer is configured to support cut-through network traffic processing.

20. The apparatus of claim 1 wherein said at least one frame buffer is configured to support store and forward network traffic processing.

21. The apparatus of claim 1 wherein said distribution circuit includes an input logic circuit and an output logic circuit.

22. The apparatus of claim 1 wherein said aggregation circuit generates control signals to activate and deactivate selected microcode controlled state machines.

23. The apparatus of claim 1 wherein said aggregation circuit generates rule feedback for said microcode stored in said associated control stores of said plurality of microcode controlled state machines.

24. The apparatus of claim 1 wherein said plurality of microcode controlled state machines are configured to monitor any bit of said input network traffic.

25. The apparatus of claim 1 wherein said plurality of microcode controlled state machines, said distribution circuit, and said aggregation circuit operate to redirect said input network traffic.

26. The apparatus of claim 1 wherein said plurality of microcode controlled state machines, said distribution circuit, and said aggregation circuit operate to duplicate said input network traffic.

27. The apparatus of claim 1 wherein said plurality of microcode controlled state machines, said distribution circuit, and said aggregation circuit operate to limit the rate of said input network traffic.

28. The apparatus of claim 1 wherein said plurality of microcode controlled state machines, said distribution circuit, and said aggregation circuit operate to process header and payload of said input network traffic in a unified manner.

29. The apparatus of claim 1 positioned inside a firewall perimeter.

30. The apparatus of claim 1 including a first port to receive said input network traffic, a second port to route said output network traffic, and a third port for management communications and routing of selective output network traffic.

31. The apparatus of claim 1 wherein said distribution circuit, said plurality of microcode controlled state machines and said aggregation circuit form a first path routing traffic in a first direction, said apparatus further comprising a second path routing traffic in a second direction opposite said first direction, said second path including a second distribution circuit aligned with said aggregation circuit, a second plurality of microcode controlled state machines aligned with said plurality of microcode controlled state machines, and a second aggregation circuit aligned with said distribution circuit.

32. The apparatus of claim 31 wherein said plurality of microcode controlled state machines and said second plurality of microcode controlled state machines exchange control information.

33. The apparatus of claim 1, wherein all of said plurality of microcode state machines have simultaneous access to a global state table.

* * * * *